(12) United States Patent
Takahashi et al.

(10) Patent No.: US 8,320,716 B2
(45) Date of Patent: Nov. 27, 2012

(54) ISSUING A PAPER VOUCHER FOR STORED IMAGE DATA

(75) Inventors: Hideaki Takahashi, Shijiri (JP); Chiaki Furuya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 400 days.

(21) Appl. No.: 12/412,976

(22) Filed: Mar. 27, 2009

(65) Prior Publication Data

US 2009/0244656 A1  Oct. 1, 2009

(30) Foreign Application Priority Data

Mar. 28, 2008  (JP) ................. 2008-085745

(51) Int. Cl.
*G06K 9/60* (2006.01)
*G06K 15/00* (2006.01)

(52) U.S. Cl. .................... 382/305; 358/1.14

(58) Field of Classification Search ............ 358/1.14, 358/1.15; 382/305
See application file for complete search history.

(56) References Cited

U.S. PATENT DOCUMENTS

| | | | |
|---|---|---|---|
| 7,653,592 B1* | 1/2010 | Flaxman et al. | 705/38 |
| 8,253,952 B2 | 8/2012 | Tsuchitoi | |
| 2004/0202386 A1 | 10/2004 | Quine | |
| 2006/0072779 A1* | 4/2006 | Erol | 382/100 |
| 2007/0195351 A1* | 8/2007 | Mashtare et al. | 358/1.13 |
| 2007/0208669 A1* | 9/2007 | Rivette et al. | 705/59 |
| 2007/0271344 A1* | 11/2007 | Danasekaran et al. | 709/206 |
| 2009/0070881 A1* | 3/2009 | Yellepeddy et al. | 726/26 |

FOREIGN PATENT DOCUMENTS

| | | |
|---|---|---|
| EP | 1283485 A1 | 2/2003 |
| JP | 2002-137452 | 5/2002 |
| JP | 2005-141423 | 6/2005 |
| JP | 2005-167600 A | 6/2005 |
| JP | 2006-146527 A | 6/2006 |
| JP | 2006-268837 A | 10/2006 |
| JP | 2007-116646 | 5/2007 |
| JP | 2007-172006 A | 7/2007 |

OTHER PUBLICATIONS

European Search Report, EP Application No. 09004193, Mailed Jul. 1, 2009.

* cited by examiner

*Primary Examiner* — Benny Q Tieu
*Assistant Examiner* — Eric A Rust
(74) *Attorney, Agent, or Firm* — Nutter McClennen & Fish LLP; John J. Penny, Jr.; Christina M. Sperry (57) ABSTRACT

A voucher data management system is provided. An image data generating section reads an original of a voucher to be copied and supplied to a user and generates voucher image data. A database stores the voucher image data. An access code generating section generates an access code for accessing the voucher image data stored in the database. An access code outputting section outputs the access code to the user. An image data outputting section reads out the voucher image data corresponding to the access code from the database in a case where the image data outputting section is accessed from the external terminal based on the access code, determines an attribute of the user who operates the external terminal, determines a range of the voucher image data to be output to the external terminal based on the determined attribute, and outputs the determined range of the voucher image data.

4 Claims, 6 Drawing Sheets

| USER ID | USER INFORMATION | AUTHENTICATION INFORMATION | ATTRIBUTE INFORMATION |
|---|---|---|---|

*FIG. 2 (b)*

| URL | USER ID | VOUCHER IMAGE DATA |
|---|---|---|

ISSUING A PAPER VOUCHER FOR STORED IMAGE DATA

Priority is claimed to Japanese Patent Application No. 2008-085745 filed Mar. 28, 2008, the disclosure of which, including the specification, drawings and claims, is incorporated herein by reference in its entirety.

BACKGROUND

The present invention relates to a voucher data management system that stores data relating to a voucher and a method for controlling a voucher data management system.

In writing a voucher such as a contract document or an application form and a duplicate copy of the voucher, a process in which, for example, a contract document including a copy sheet is handed over to a customer, the customer writes the original of the contract document by writing the contract document, and simultaneously duplicate copies for the customer and an accounting division as paper media are generated has been widely performed. In addition, printers such as dot-impact printers having a printing function for a copy sheet have been known (for example, see Patent Document 1), and a process in which the duplicate copy is simultaneously written together with the original by using such a printer has been performed.

Patent Document 1: Japanese Patent Publication No. 2002-137452A

However, in descriptions above, the duplicate copies for the customer and the accounting division which are written simultaneously with the original by using the copy sheets are directly handed over to the customer and a staff of the accounting division. In such a case, the space for storing the duplicate copies is needed, and accordingly, there are a problem that paper sheets cannot be saved and the like. However, a technique for effectively writing a sheet of the duplicate copy without using a copy sheet has not been known.

SUMMARY

It is therefore an object of at least one embodiment of the invention to write a voucher of which a duplicate copy is needed without using a copy sheet.

In order to achieve the above-described object, according to an aspect of at least one embodiment of the present invention, there is provided a voucher data management system comprising: an image data generating section that reads an original of a voucher to be copied and supplied to a user and generates voucher image data; a database that stores the voucher image data; an access code generating section that generates an access code for accessing the voucher image data stored in the database; an access code outputting section that outputs the access code to the user; and an image data outputting section that reads out the voucher image data corresponding to the access code from the database in a case where the image data outputting section is accessed from the external terminal based on the access code, determines an attribute of the user who operates the external terminal, determines a range of the voucher image data to be output to the external terminal based on the determined attribute, and outputs the determined range of the voucher image data.

Under this configuration, the voucher image data that is generated by the image data generating section is stored in the database, and the access code is generated by the access code generating section and is notified to the user. Here, when the user accesses the image data outputting section based on the access code by operating the external terminal, the voucher image data corresponding to the access code is output to the terminal that is operated by the user. Accordingly, the user can view the voucher image data that is acquired by reading out the voucher based on the access code. Thus, when the user has the access code instead of the duplicate copy of the original of the voucher, it is not necessary to store a sheet of the duplicate copy of the voucher. Accordingly, the duplicate copy as a paper sheet is not needed, and therefore a voucher of which a duplicate copy is needed can be written and generated without using a copy sheet. In addition, a range of the voucher image data that is determined based on the attribute of the user is output to the external terminal that is operated by the user. Accordingly, a function for not transmitting information that is not needed for the user or hiding information that is not appropriate to be open to the public or confidential information can be implemented while a function as a duplicate copy of the voucher is maintained. Therefore, protection of information can be achieved while convenience equivalent to that of a duplicate copy of the voucher is acquired.

The access code outputting section may include a printer that prints the access code.

Under such a configuration, a sheet, for example, formed of paper, synthetic resin, or the like on which the access code is printed is output to the user, and accordingly, transmission and storage of the access code can be performed in an easy manner. Here, the size of the recording medium used for printing the access code can be configured to be smaller than that of the voucher. Accordingly, the storage space can be reduced, compared to a case where the paper sheets of the duplicate copies are stored, and thereby an effort relating to the storage can be reduced.

Under this configuration, when a configuration in which the access code is printed in such a form that the access code can be read out by the external terminal operated by the user is used, the user does not need to input the access code by using a keyboard or the like. Accordingly, the access for acquiring the voucher image data can be performed by a simple operation without incurring any error. Therefore, the user convenience is improved.

The access code outputting section may output the access code in an electronic mail to a pre-registered device to be operated by the user.

Under such a configuration, when the access code is output to the user, a paper sheet or the like is not needed. Accordingly, it is possible to further decrease the amount of consumption of paper sheets and save the storage space.

The image data generating section may include a printer that prints the original and a scanner that automatically scans the printed original to generate the voucher image data.

Under this configuration, the original of the voucher that is output by the printer is automatically scanned so as to generate the voucher image data. Accordingly, only by preparing the original of the voucher by performing a printing process without using a copy sheet, the voucher image data can be generated in a speedy and simple manner.

The image data outputting section may output the voucher image data to the external terminal only a predetermined number of times.

Under this configuration, the number of times of output of the voucher image data can be limited. Thus, for example, unnecessary output of the voucher image data can be prevented. Accordingly, the voucher image data can scarcely be misused, and thereby the reliability can be improved.

According to another aspect of at least one embodiment of the present invention, there is provided a method for controlling a voucher data management system that manages voucher image data, comprising: reading an original of a voucher to be copied and supplied to a user and generating the voucher image data; storing the generated voucher image data; generating an access code for accessing the stored voucher image data; outputting the generated access code to the user; reading out the stored voucher image data corresponding to the access code in a case where the user operates an external terminal to access the voucher data management system based on the access code; determining an attribute of the user who operates the external terminal; determining a range of the voucher image data to be output to the external terminal based on the determined attribute; outputting the determined range of the voucher image data.

According to the present invention, the access code instead of a duplicate copy of a voucher is output to the user. Thus, the user can view the voucher image data based on the access code, and accordingly, it is not necessary to store a paper sheet of the duplicate copy of the voucher. Therefore, a voucher of which a duplicate copy is needed can be prepared and generated without using a copy sheet. In addition, since a range of the voucher image data according to the attribute of the user is output, protection of information can be achieved while convenience equivalent to that of a duplicate copy of the voucher is acquired.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, an embodiment of the present invention will be described with reference to the accompanying drawings.

Figure 1:
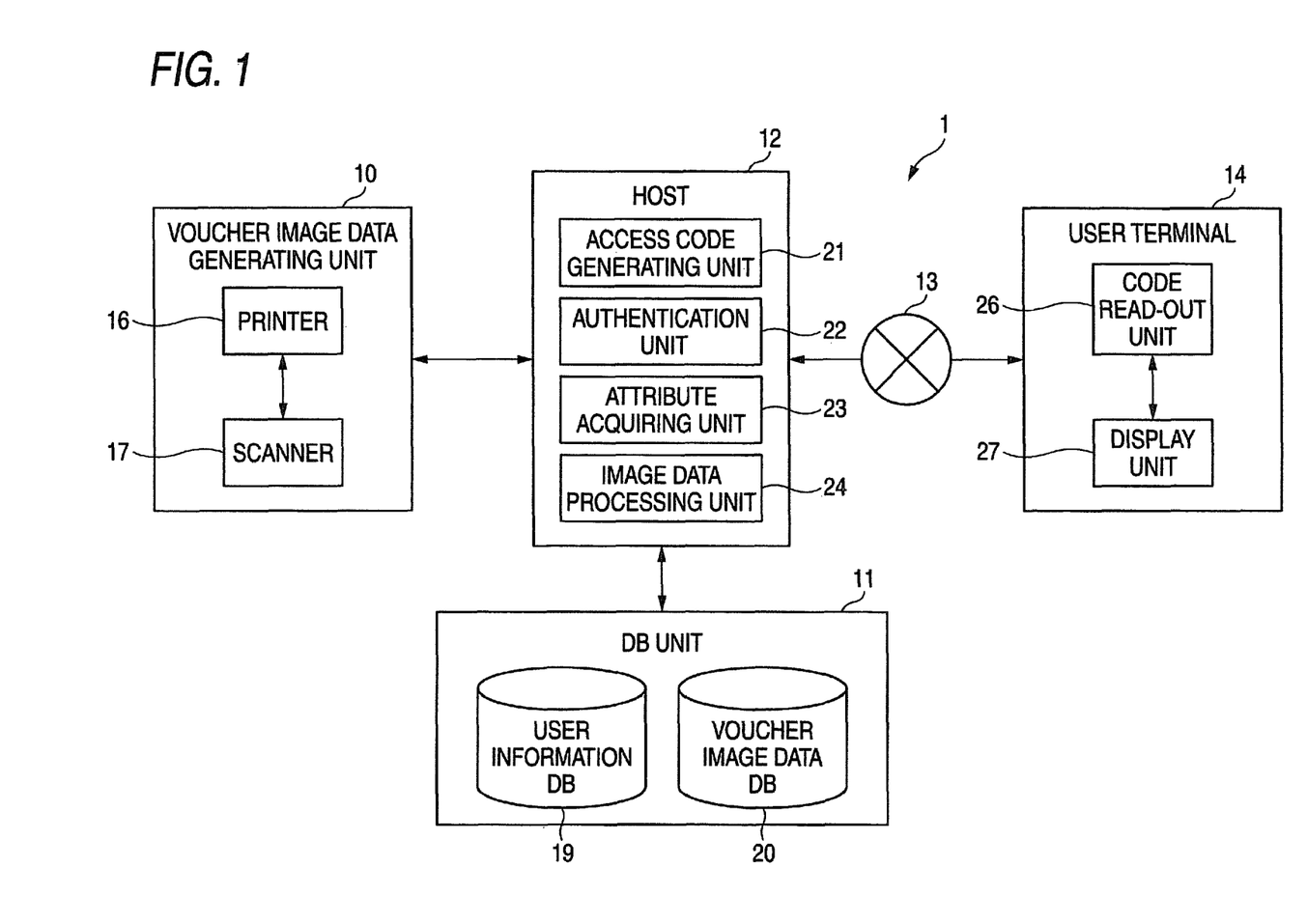
FIG. 1 is a schematic diagram illustrating the configuration of a voucher data management system according to an embodiment of the present invention.

The voucher data management system 1 shown in FIG. 1 is a system that provides a voucher to be copied and supplied to a user is provided not as a paper medium but as an electronic voucher. This voucher data management system 1 includes a voucher image data generating unit 10, a DB (database) unit 11, and a host 12 that is connected to the voucher image data generating unit 10 and the DB unit 11 through an interface not shown in the figure. To this host 12, a user terminal 14 is connected through a network 13 such as the Internet or a mobile communication network.

In descriptions below, a voucher is written as a valid document such as a contract document, an application form, or an expense sheet. Generally, the voucher is a document of a type for which a duplicate copy other than an original is needed to be written. The voucher may be public or private, and the type or the basis of validity of the voucher does not have any limitation.

When voucher image data is displayed in a display unit 27 of the user terminal 14 as a terminal operated by a user, an electronic voucher represents the displayed voucher image data. That is because the displayed voucher image data corresponds to an electronic version of a document voucher. An operation for "issuing an electronic voucher to a user" represents an operation for displaying the voucher image data on a screen of a terminal operated by the user.

In addition, the user represents a person to whom the electronic voucher written based on the original is provided and includes, for example, not only a general customer but also a staff of an accounting division and the like.

The voucher image data generating unit 10 includes a printer 16 and a scanner 17.

The printer 16 is a printing apparatus that prints an image including a text on a sheet-shaped recording medium formed of paper, synthetic resin, or the like. In this embodiment, the printer 16 prints out a voucher by printing an image including a text on a recording medium (hereinafter, referred to as a paper medium) made of paper. The printer 16 performs a printing process based on data that is transmitted as image data (hereinafter, referred to as "print data") to be printed on the paper medium from the host 12. The printer 16 serves as a printing apparatus that prints an access code to be described later, in addition to serving as the voucher printing apparatus that prints an original of the voucher. In the printer 16, a paper medium of a large size or an ordinary size that is used for printing a voucher or a paper medium of a small size that is used for printing the access code can be used.

The scanner 17 includes a read-out unit (not shown) that has an image pickup element such as a CCD or a CMOS. The scanner 17 reads out a text or an image that is recorded in the sheet-shaped medium formed of paper, synthetic resin, or the like by using a read-out unit and generates read-out image data, under control of the host 12. In this embodiment, the scanner 17 reads out a voucher acquired from handwriting on a predetermined paper sheet and a voucher that is printed out by the printer 16 and generates the "voucher image data".

Here, the printer 16 and the scanner 17 according to this embodiment have a hardware structure in which the voucher printed out by the printer 16 is directly transported to the read-out unit (not shown) of the scanner 17. Accordingly, by cooperatively operating the printer 16 and the scanner 17 under the control of the host 12, the voucher output by the printer 16 is automatically read out by the scanner 17, so that the voucher image data can be generated. In particular, when print data relating to the original of the voucher is transmitted from the host 12, the printer 16 prints and outputs the original of the voucher based on the print data. After the printed original of the voucher is transported to a predetermined position of the scanner 17 by transport means not shown in the figure, the scanner 17 reads out the original of the voucher and generates the voucher image data.

The DB unit 11 includes user information DB 19 and voucher image data DB 20 as databases.

Figure 2:
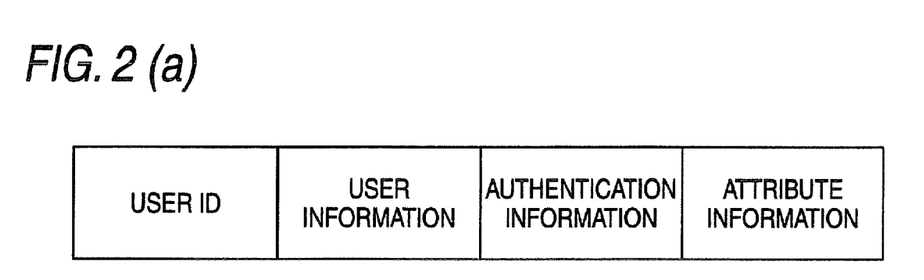
FIG. 2(a) is a schematic diagram illustrating an example of the configuration of information that is stored in user information DB 19 of a DB unit 11.
FIG. 2(b) is a schematic diagram illustrating an example of the configuration of information that is stored in voucher image data DB 20 of the DB unit 11.

The user information DB 19 is a database for storing various types of information on users for each user. In the user information DB 19, as shown in FIG. 2(*a*), a user ID that is uniquely assigned to each user, user information that includes personal information of a user such as a name and an address, authentication information that includes a password or the like for user authentication, and attribute information that represents a user's attribute are stored in association with one another. The attribute of a user is a group among predetermined groups to which the user belongs. In this embodiment, as the attribute of the user, there are "customer" that represents a general customer and "accounting division" the represents an accounting division.

The voucher image data DB 20 is a data base for storing the voucher image data that is generated by the voucher image data generating unit 10. In the voucher image data DB 20, as shown in FIG. 2(*b*), in correspondence with a user ID, voucher image data to be supplied to a user corresponding to the user ID and an URL (Uniform Resource Locator) used for accessing the voucher image data from the user terminal 14 that is connected to the network 13 are stored.

The host 12 controls the entire voucher data management system 1. As described above, the host 12 transmits or receives various types of data such as print data to or from the printer 16 of the voucher image data generating unit 10 and the scanner 17. In addition, the host 12 accesses each database of the DB unit 11. This host 12, as shown in FIG. 1, includes an access code generating unit 21, an authentication unit 22, an attribute acquiring unit 23, and an image data processing unit 24.

The access code generating unit 21 generates a code that can be read out by the user terminal 14 as a code for accessing the voucher image data that is stored in the voucher image data DB 20. In particular, when storing the voucher image data in the voucher image data DB 20, the host 12 generates the above-described URL for accessing the voucher image data from the user terminal 14 and stores this URL, the voucher image data, and the user ID in the voucher image data DB 20 in correspondence with one another. At this moment, the access code generating unit 21 generates data relating to the access code that includes information representing this URL based on the generated URL. As a detailed example of the access code, there are a bar code (a JAN code, EAN, UPC, an ITF code, CODE 39, CODE 128, NW-7, or the like) that represents by using areas of two colors of a black color and a white space aligning in one direction and a two-dimensional code (a QR code (registered trademark), PDF 417, CODE 49, or the like) that represents information by using black areas and white space areas aligning in the horizontal and vertical directions, and the like. In the voucher data management system 1 according to this embodiment, the two-dimensional code is used as an example of the access code.

The authentication unit 22 performs an authentication process for a user using a user terminal 14 when the user terminal 14 accesses the host 12 through the network 13. In particular, when the user terminal 14 access the host 12, the authentication unit 22 performs various authentication operations including requesting the user terminal 14 to input a user ID and a password, accessing the user information DB 19 of the DB unit 11 based on the user ID that is input in response to the request, and matching the user ID and the password, as are necessary.

When the user terminal 14 requests the host 12 to acquire the voucher image data that is stored in the voucher image data DB 20, the attribute acquiring unit 23 acquires the attribute information of the user before output of the voucher image data to the user terminal. In particular, when the user terminal 14 requests the host 12 to access the voucher image data that is stored in the voucher image data DB 20, the attribute acquiring unit 23 accesses the user information DB 19 and acquires the attribute information for the user based on the user ID of the user relating to the user terminal 14 that accesses the host 12.

When the voucher image data is to be output to the user terminal 14, the image data processing unit 24 changes the range of the voucher image data to be output in accordance with the attribute information that is acquired by the attribute acquiring unit 23 and outputs the voucher image data. In addition, detailed correspondence between the attribute information and the range of the voucher image data, that is, a detailed example in which the range of the voucher image data to be output is set for specific attribute information and the advantages thereof will be described later.

On the other hand, the user terminal 14 that is connected to the host 12 through the network 13 is a device that includes at least a code read-out unit 26 that reads out the access code and a display unit 27 that displays the voucher image data output from the host 12 to be visually recognizable. As examples of the user terminal 14, there are a personal computer including a two-dimensional code reader that is used for reading a two-dimensional code, a camera-attached cellular phone that is configured to read out a two-dimensional code, and the Subsequently, the operation of the voucher data management system 1 will be described.

In descriptions below, it is assumed that there are a general customer (hereinafter, simply referred to as a "customer") and a staff of the accounting division (hereinafter, simply referred to as an "accounting division") as users, and the electronic voucher is issued to the customer and the accounting division. In addition, it is assumed that the user IDs are already assigned to the customer and the accounting division, and the user IDs are stored in the user information DB 19 together with the user information, the authentication information, and the attribute information. In addition, it is assumed that "customer" is assigned to the customer as the attribute information, and "accounting division" is assigned to the accounting division as the attribute information. In addition, it is assumed that the customer has written the original of the contract document as the voucher in advance, a copy sheet is not used for the original of the contract document, and a duplicate copy of the contract document is not written together with the customer's writing the original of the contract document.

Figure 3:
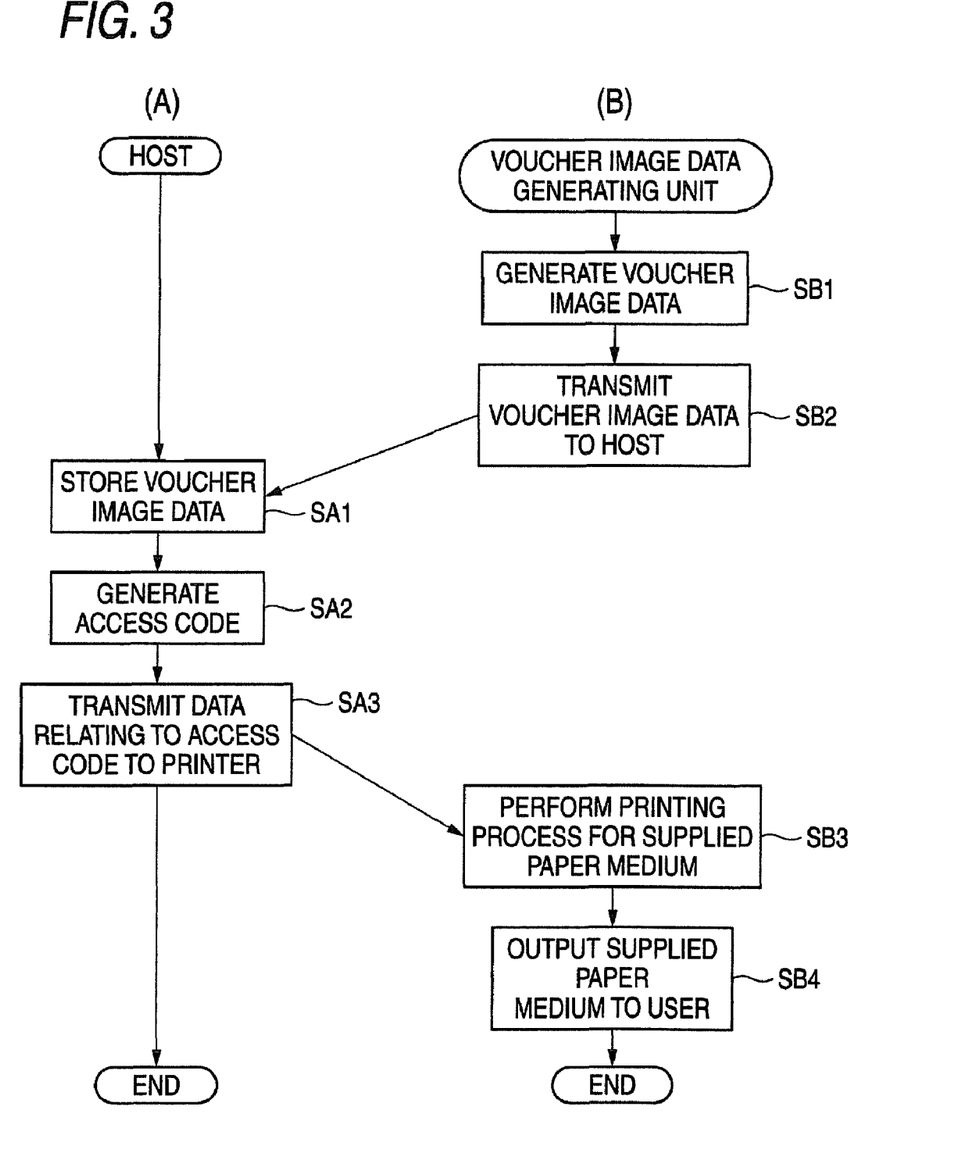
FIG. 3 is a flowchart illustrating an operation of the voucher data management system.

FIG. 3 is a flowchart illustrating a series of operations until the access code for accessing the voucher image data that is stored in the voucher image data DB 20 is output to the user after the original of the contract document is read by the scanner 17. Column (A) represents the operation of the host 12, and Column (B) represents the operation of the voucher image data generating unit 10.

First, the original of the contract document written by the customer is read out by the scanner 17 of the voucher image data generating unit 10, and the voucher image data (hereinafter, for the convenience of description, the voucher image data generated here is referred to as "contract document image data") relating to this original is generated (Step SB1). Since the contract document image data generated in this Step SB1 is generated based on the original of the contract document written by the customer, data relating to an image such as handwriting or imprinted seal of the customer is included.

Thereafter, the voucher image data generating unit 10 transmits the generated contract document image data to the host 12 (Step SB2).

The host 12 that has received the contract document image data stores the contract document image data in the voucher image data DB 20 (Step SA1). At that moment, the host 12 generates a URL for accessing the contract data image data from the user terminal 14 and stores this URL, the contract document image data, and the user ID in the voucher image data DB 20 in correspondence with one another. In addition, the access code generating unit 21 of the host 12 generates data relating to the access code including information representing the URL base on the generated URL (Step SA2). Then, the host 12 transmits the data relating to the generated access code as print data to the printer 16 of the voucher image data generating unit 10 (Step SA3). At that moment, the host 12 prints two copies of the paper sheets, on which the access code is written, including a copy for the customer and a copy for the accounting division. Thus, the host 12 transmits the data relating to the access code to the printer 16 together with data indicating the print data for the customer. In addition, the host 12 transmits the data relating to the access code to the printer 16 together with data indicating the print data for the accounting division.

Figure 4:
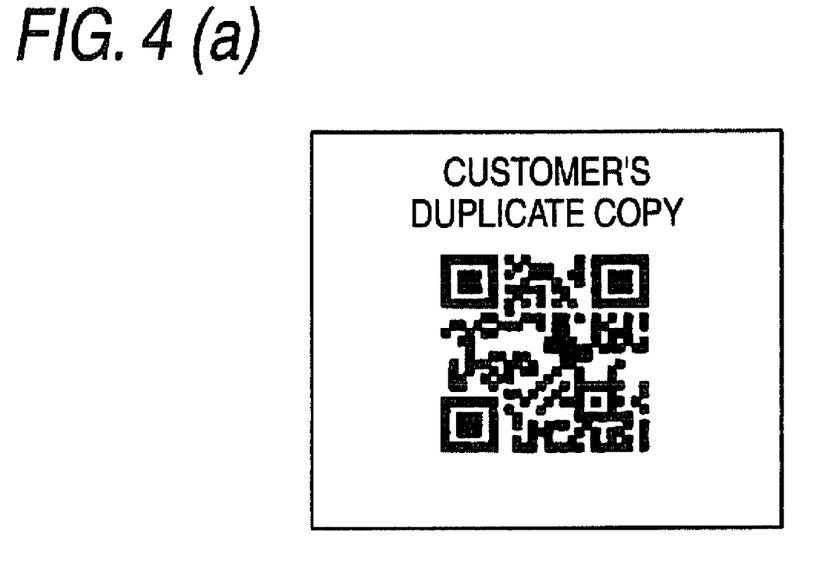
FIG. 4(a) is a diagram illustrating an example of a paper medium on which an access code for a customer is written.
FIG. 4(b) is a diagram illustrating an example of a paper medium on which an access code for an accounting division is written.

As shown in FIGS. 4(*a*) and 4(*b*), the printer 16 of the voucher image data generating unit 10 that receives the print data relating to the access 25 code prints the access code on the paper medium (hereinafter, referred to as "supplied paper medium") (Step SB3). In particular, the printer 16 outputs a supplied paper medium on which the access code and a writing for the customer's copy (writing of "customer's duplicate copy" in FIG. 4(*a*)) are printed based on the print data of the access code transmitted together with the data indicating a customer's copy, as shown in FIG. 4(*a*). In addition, the printer 16 outputs a supplied paper medium on which the access code and a writing for the accounting division's copy (writing of "accounting division's duplicate copy" in FIG. 4(*b*)) are printed based on the print data relating to the access code transmitted together with the data indicating the accounting division's copy, as shown in FIG. 4(*b*). Here, the supplied paper media that are output are provided (output) to the user and the accounting division (Step SB4). In other words, the printer 16 serves as an access code outputting unit by performing a printing process for the supplied paper media.

As described above, according to this embodiment, after the customer writes the original of the contract document, instead of the duplicate copies of the contract document, the paper media on which the access codes as shown in FIGS. 4(*a*) and 4(*b*) are respectively printed are supplied to the customer and the accounting division. Here, conventionally, duplicate copies for the customer and the accounting division, which are written simultaneously with the original by using a copy sheet, are handed over to the customer and the accounting division. However, the terms of the contract, the customer information, various cautionary statements, and the like are written in the duplicate copies, and thus, the duplicate copies are large-sized frequently. However, according to this embodiment, the supplied paper medium of a size for which the access code and simple information can be printed is sufficient, and accordingly, miniaturization of the supplied paper medium can be implemented. Therefore, the paper medium can be saved. In addition, the space needed to be acquired for storage can be reduced, and accordingly, an effort for storage of the supplied paper medium can be reduced. In particular, duplicate copies of conventional contract documents or the like may have different sizes depending on the terms and type of the contract, frequently. However, according to this embodiment, only the access code and simple information are needed to be printed on all the supplied paper media. Thus, the sizes of the supplied paper media become even, and accordingly, the operation for storing the supplied paper media can be performed in an easy manner. In addition, the copy sheet is not needed, and the cost required for the copy sheet can be reduced.

In addition, in many cases, the duplicate copy using a conventional paper sheet includes confidential information that includes personal information such as the name and the address of the customer, the terms of the contact, and the like. However, information included in the voucher is not printed on the supplied paper medium that is handed over according to this embodiment, and accordingly, protection of the information can be achieved.

Next, a series of operations until the contract document image data is output to the user terminal 14 to be displayed in the display unit 27 as an electronic voucher after the user accesses the host 12 by using the user terminal 14 for reading an image relating to the contract document image data will be described with reference to the flowchart shown in FIG. 5.

First, the host 12 monitors whether there is a request for acquiring the contract document image data from the user terminal 14 (Step SC1). Here, the operation for requesting to acquire the contract document image data which is performed by the user terminal 14 will be described. The user that reads the image relating to the contract document image data, first, reads out the access code that is printed on the supplied paper medium by the code read-out unit 26 of the user terminal 14. Accordingly, the request for the host 12 to acquire the contract document image data relating to the URL is made based on the information on the URL added to the access code.

As described above, in the voucher data management system 1 according to this embodiment, when the user terminal 14 accesses the host 12 so as to acquire the contract document image data, the URL is not needed to be input, for example, by using a keyboard. Thus, the host 12 can be accessed by a simple operation of reading out the access code by using the code read-out unit 26, and accordingly, the user convenience is improved.

When there is the request for acquiring the contract document image data (Step SC1: YES), the authentication unit 22 of the host 12 performs an authentication operation so as to check that the request for acquiring the contract data image data is made from a valid user (Step SC2). As described above, according to this embodiment, when there is a request for acquiring the contract document image data, the authentication operation is performed. Accordingly, even when the user lost the supplied paper medium and another person acquires the lost supplied paper medium, the person cannot acquire the contract document image data. Therefore, the security is improved.

Thereafter, the attribute acquiring unit 23 of the host 12 determines the attribute of the user by acquiring the attribute information of the user (Step SC3). In addition, the host 12 acquires the contract document image data relating to the URL at a time when the access is made from the user terminal 14 by accessing the voucher image data DB 20 (Step SC4).

After the contract document image data is acquired, the image data processing unit 24 of the host 12 determines (changes) the range of the contract document image data to be output to the user terminal 14 in accordance with the attribute of the user that is acquired by the attribute acquiring unit 23 and processes the contract document image data such that the determined (changed) range is output (Step SC5). Here, the operation of Step SC5 will be described in detail.

In the voucher data management system 1 according to this embodiment, the range of the contract document image data to be output to the user terminal 14 is set for each attribute of the user of the host 12 in advance.

In particular, in an electronic voucher of a customer, it is preferable that all types of information including the personal information such as the name and the address of the customer are represented for accomplishing an appropriate role as a duplicate copy of the contract document. Accordingly, when the user using the host 12 has the attribute information of "customer", all the range of the contract document image data is set as an output target. On the other hand, even when the personal information such as the name and the address of the customer, the image of the seal imprinted by the customer, and the like are not represented in an electronic voucher of the accounting division, there is no trouble for the operation. In addition, the above-described personal information is required not to be represented in the electronic voucher for the accounting division in the viewpoint of prevention of leakage. Accordingly, the user using the host 12 determines that the personal information and the image of the seal are not set as an output target in a case where the attribute information is "accounting division". In addition, the above-described function is implemented by a dedicated program that is loaded in the host 12.

Then, in Step SC5, the image data processing unit 24 of the host 12 processes the contract document image data for each type of the attribute information and changes the range of the contract document image data to be output to the user terminal 14 such that the range of the contract document image data determined by the user using the host 12 in advance is output to the user terminal 14. At that moment, the image data processing unit 24 adds data indicating customer's contract document image data to the contract document image data to be output to the user terminal 14 used by the customer and adds data indicating accounting division's contract document image data to the contract document image data to be output to the user terminal 14 used by the accounting division.

After the contract document image data is processed by the image data processing unit 24, the host 12 outputs the processed contract document image data to the user terminal 14 through the network 13 (Step SC6). Accordingly, the electronic voucher relating to the contract document image data can be displayed in the display unit 27 of the user terminal 14, and the user can recognize this electronic voucher visually.

In addition, in the operations represented in Steps SC5 to SC6, the host 12 serves as a voucher image data outputting unit.

Figure 6:
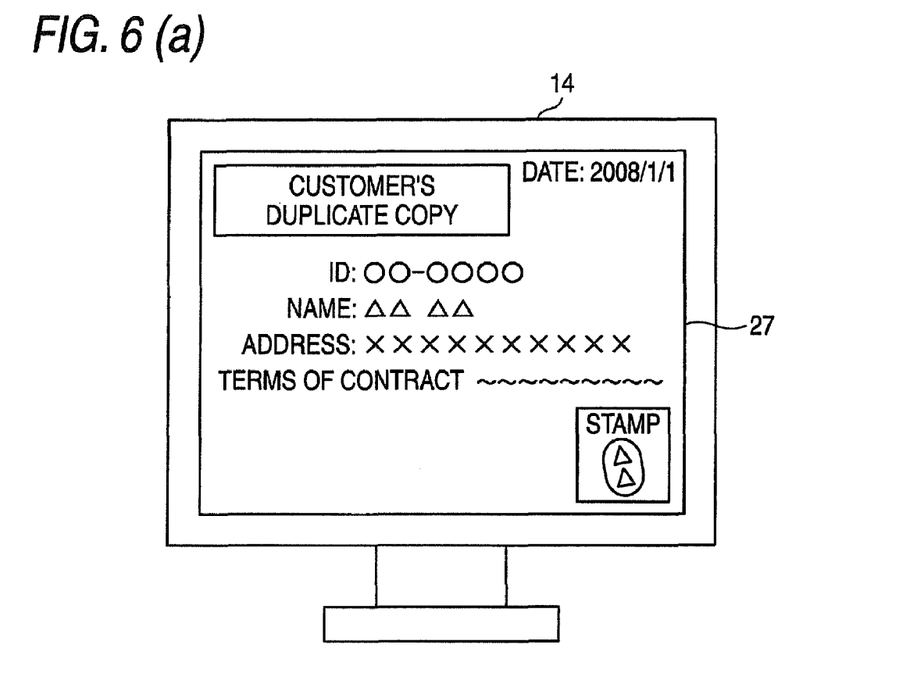
FIG. 6(a) is a schematic diagram illustrating an example of an electronic voucher that is displayed in a display unit of a user terminal that is user by the customer.
FIG. 6(b) is a schematic diagram illustrating an example of an electronic voucher that is displayed in a display unit of a user terminal that is used by the accounting division.

As shown in FIG. 6(*a*), when the electronic voucher is displayed in the user terminal 14 that is used by the customer, the image of the original of the contract document written by the customer is directly displayed together with a display (in FIG. 6(*a*), a display of "customer's duplicate copy") indicating a customer's duplicate copy. Accordingly, the customer can refers to the handwriting or the imprinted seal of the customer, and thereby the customer can recognize that the electronic voucher displayed in the display unit 27 is generated based on the original of the contract document assuredly.

On the other hand, as shown in FIG. 6(*b*), when the electronic voucher is displayed in the user terminal 14 that is used by the accounting division, the image of the original of the contract document is displayed together with a display (in FIG. 6(*b*), a display of "accounting division's duplicate copy") indicating a accounting division's duplicate copy. At that moment, as is apparent by comparing FIG. 6(*b*) with FIG. 6(*a*), information of the customer's name, information of the address, and the image of the imprinted seal are configured not to be displayed. Accordingly, leakage of the customer's personal information can be prevented assuredly.

As described above, according to this embodiment, the voucher image data that is generated by the voucher image data generating unit 10 is stored in the voucher image data DB 20, the access code is generated by the access code generating unit 21, and the supplied paper medium on which the access code is printed, instead of the duplicate copy of the original of the voucher, is supplied to the user. Here, conventionally, the duplicate copies for the customer and the accounting division that are written simultaneously with the original are handed over to the customer and the accounting division. However, the terms of the contract, the customer information, various cautionary statements, and the like are written in the duplicate copies, and thus, the duplicate copies are large-sized frequently. However, according to this embodiment, the supplied paper medium of a size for which the access code and simple information can be printed is sufficient, and accordingly, miniaturization of the supplied paper medium can be implemented. Therefore, the paper medium can be saved. In addition, the space needed to be acquired for storage can be reduced, and accordingly, an effort for storage of the supplied paper medium can be reduced.

In addition, when there is a request for the host 12 to acquire the voucher image data based on the access code that is printed on the supplied paper medium, the attribute information is acquired by the attribute acquiring unit 23 of the host 12, and the range of the voucher image data to be output to the user terminal 14 is changed in accordance with this attribute information. Accordingly, when the electronic voucher is displayed in the display unit 27, unnecessary information is not displayed, and thereby protection of the information can be achieved.

In addition, according to this embodiment, the supplied paper medium on which the access code is written is printed by the printer 16, and the supplied paper medium is supplied to the user. Accordingly, the access code is supplied (output) to the user. Thus, as described above, the supplied paper medium of a size for which the access code and simple information can be printed is sufficient, and accordingly, miniaturization of the supplied paper medium can be implemented. Therefore, the paper medium can be saved. In addition, the space needed to be acquired for storage can be reduced, and accordingly, an effort for storage of the supplied paper medium can be reduced. In addition, when the user accesses the host 12 so as to acquire the contract document image data by using the user terminal 14, the URL is not needed to be input, for example, by using a keyboard. Therefore, the desired voucher image data can be accessed without incurring any error by performing a simple operation of reading out the access code that is written on the supplied paper medium by using the code read-out unit 26, and accordingly, the user convenience is improved.

In addition, the above-described embodiment represents only one embodiment of the present invention and may be arbitrarily changed or applied therein without departing the scope of the present invention.

In the above-described embodiment, the access code is supplied (output) to the user by providing the user the supplied paper medium. However, the method of supplying the access code to the user is not limited thereto. For example, it may be configured that data relating to the access code that is generated by the access code generating unit 21 is transmitted to the user via an electronic mail by transmitting the data to a mail address corresponding to the user terminal 14, another personal computer, or a cellular phone that is set as the terminal device used by the user in advance, whereby the access code is supplied to the user.

Under such a configuration, a paper sheet is not needed for supplying the access code to the user, and accordingly, needed paper sheets can be decreased further.

In addition, according to the above-described embodiment, in Step SB1 shown in FIG. 3, the voucher image data is generated by reading out the original of the contract document using the scanner 17. However, the method of generating the voucher image data is not limited thereto. For example, as described above, it may be configured that the print data relating to the original of the voucher is output to the printer 16 from the host 12, the printer 16 prints out the original of the voucher based on the print data, the original of the output voucher is transported to a predetermined position of the scanner 17 by a transport unit not shown in the figure, and then, the scanner 17 generates the voucher image data by reading out the original of the voucher using the scanner 17.

Under such a configuration, the voucher image data is automatically generated based on the original of the voucher that is output by the printer 16, and accordingly, the voucher image data can be generated in a simple manner.

In addition, according to the above-described embodiment, the number of times of outputting the voucher image data to the user terminal 14 is not limited to a specific value. However, there may be a limitation on the number of times of outputting the voucher image data. For example, when the voucher image data is stored in the voucher image data DB, the host 12 stores the voucher image data together with data representing the number of times of outputting the voucher image data. Then, when there is a request for output of the voucher image data, the host 12 only performs the operation for outputting the voucher image data until a set limited number of times is reached, with reference to the data representing the number of times of output. Accordingly, in such a case, output of the voucher image data for the number of times exceeding the predetermined number is prevented. In such a case, the limited number of times may be set for each voucher image data, for each user, or for each combination of the user and the voucher image data.

Under such a configuration, unnecessary output of the voucher image data is prevented. Accordingly, unauthorized person's acquisition of the voucher image data is prevented, and thereby the reliability can be improved.

In addition, according to the above-described embodiment, when the voucher image data that is generated by the voucher image data generating unit 10 is stored in the voucher image data DB 20, the voucher image data may be encrypted.

Under such a configuration, the encrypted voucher image data as unique data having high reliability can be treated as the original paper copy of the voucher.

Figure 5:
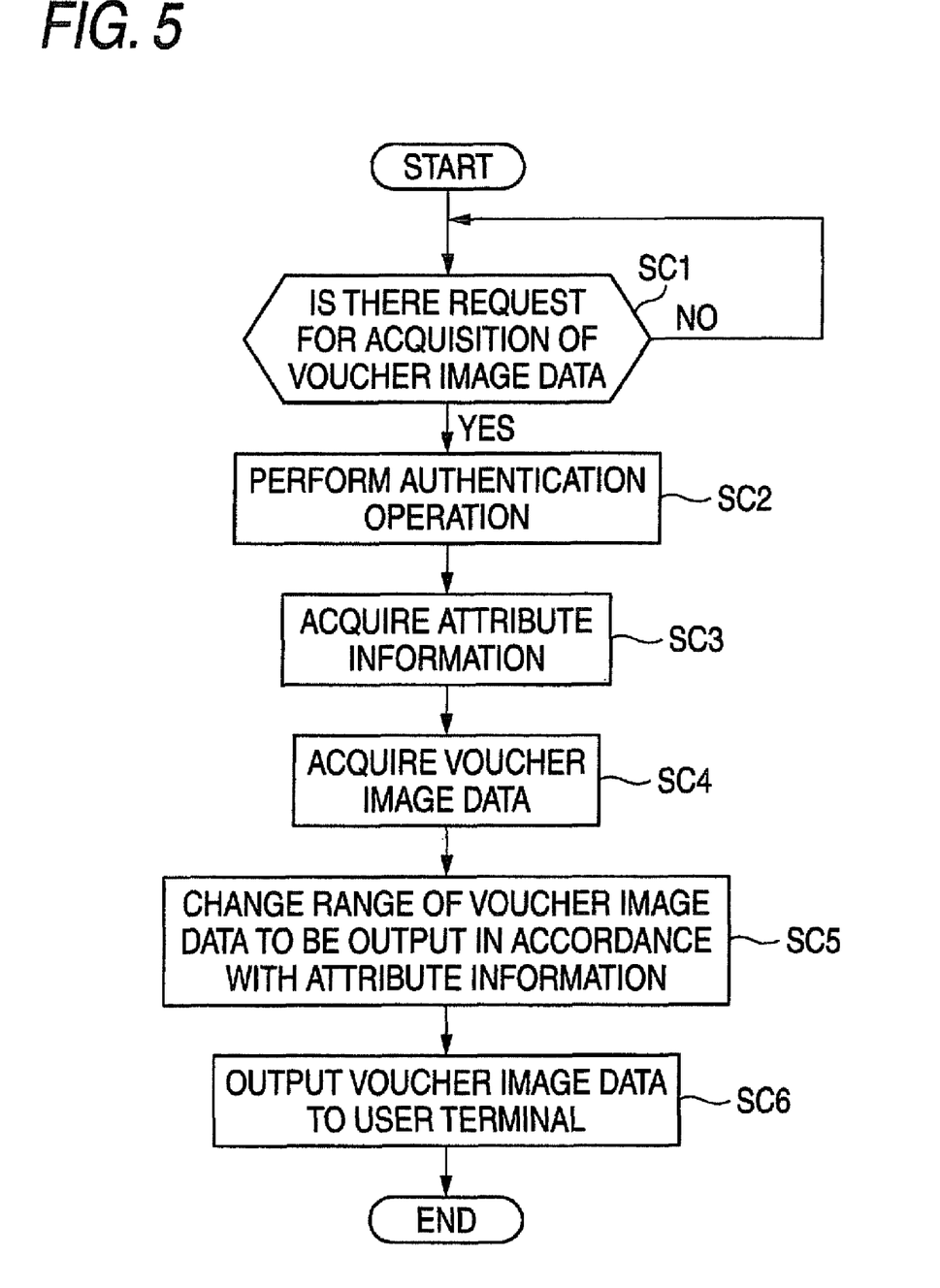
FIG. 5 is a flowchart illustrating the operation of the voucher data management system.

In addition, according to the above-described embodiment, in the flowcharts shown in FIGS. 3 and 5, a contract document has been described as an example of the voucher. However, the voucher is not limited to a contract document and may be broadly applied to an application form, an expense sheet, or other vouchers for which a duplicate copy is needed.

In addition, in the above-described embodiment, the customer's personal information is configures not to be displayed in the electronic voucher for the accounting division. However, the information configured not to be displayed is not limited thereto and may be designed appropriately based on the type of the operation.

In addition, according to the above-described embodiment, the access bar code written on the supplied paper medium is the same for the customer and the accounting division. However, when the voucher image data is stored in the voucher image data DB 20, the host 12 may store different URLs for the customer and the accounting division and write different access bar codes on the supplied paper media, so that the customer and the accounting division can access the voucher image data relating to the URLs thereof.

What is claimed is:

1. A voucher data management system comprising:
an image data generating section that reads an original of a voucher to be copied and supplied to a plurality of users and generates voucher image data;
a database that stores the voucher image data;
an access code generating section that generates a plurality of access codes for accessing the voucher image data stored in the database, the access codes being different depending on attributes of the users;
a printer that prints the access codes on paper media and outputs the paper media on which the access codes are printed to the users; and
an image data outputting section that reads out the voucher image data corresponding to one of the access codes from the database in a case where the image data outputting section is accessed from an external terminal based on the one of the access codes, determines an attribute of one of the users who operates the external terminal, determines a range of the voucher image data to be output to the external terminal based on the determined attribute of the one of the users, and outputs the determined range of the voucher image data,
wherein each of the access codes comprises a two-dimensional bar code including information representing a Uniform Resource Locator (URL) for accessing the voucher image data stored in the data base,
wherein the printer prints, on one paper medium, a character string indicating a customer attribute together with one of the access codes corresponding to the customer attribute, and
wherein the printer prints, on another paper medium, a character string indicating an accounting attribute together with another of the access codes corresponding to the accounting attribute.

2. The voucher data management system as set forth in claim 1, wherein the image data generating section includes a printer that prints the original of the voucher and a scanner that automatically scans the printed original of the voucher to generate the voucher image data.

3. The voucher data management system as set forth in claim 1, wherein the image data outputting section outputs the voucher image data to the external terminal only a predetermined number of times.

4. A method for controlling a voucher data management system that manages voucher image data, comprising:
reading an original of a voucher to be copied and supplied to a plurality of users and generating the voucher image data;
storing the generated voucher image data;
generating a plurality of access codes for accessing the stored voucher image data, the access codes being different on attributes of the users;
printing the access codes on paper media and outputting the paper media on which the access codes are printed to the users;
reading out the stored voucher image data corresponding to one of the access codes in a case where one of the users operates an external terminal to access the voucher data management system based on one of the access codes;
determining an attribute of the one of the users who operates the external terminal;
determining a range of the voucher image data to be output to the external terminal based on the determined attribute of the one of the users;
outputting the determined range of the voucher image data, wherein each of the access codes comprises a two-dimensional bar code including information representing a Uniform Resource Locator (URL) for accessing the stored voucher image data, wherein in the printing, a character string indicating a customer attribute is printed on one paper medium together with one of the access codes corresponding to the customer attribute; and wherein in the printing, a character string indicating an accounting attribute is printed on another paper medium together with another of the access codes corresponding to the accounting attribute.

* * * * *